United States Patent [19]
Von Benda et al.

[11] Patent Number: 5,364,713
[45] Date of Patent: Nov. 15, 1994

[54] STORAGE BATTERY CELL BASED ON THE PRINCIPLE OF THE OXYGEN CYCLE

[75] Inventors: Klaus Von Benda, Nürtingen; Günter Gutmann, Esslingen; Wolfgang Weger, Benningen, all of Germany

[73] Assignee: Daimler-Benz AG, Stuttgart, Germany

[21] Appl. No.: 70,531

[22] Filed: Jun. 3, 1993

[30] Foreign Application Priority Data

Jun. 4, 1992 [DE] Germany .............. 4218381

[51] Int. Cl.⁵ .............. H01M 2/26; H01M 2/30; H01M 4/44; H01M 4/00
[52] U.S. Cl. .............. 429/66; 429/68; 429/161; 429/176; 429/178; 429/206; 429/222
[58] Field of Search .............. 429/161, 186, 66, 67, 429/68, 176, 178, 206, 222

[56] References Cited

U.S. PATENT DOCUMENTS

| | | | |
|---|---|---|---|
| Re. 16,614 | 5/1927 | Edison | 429/161 X |
| 437,848 | 10/1990 | Lampert, Jr. | 429/161 |
| 478,485 | 7/1992 | Waldron | 429/161 |
| 4,025,699 | 5/1977 | Silva et al. | 429/68 X |
| 4,458,411 | 7/1984 | Dey et al. | 429/161 X |

FOREIGN PATENT DOCUMENTS

| | | |
|---|---|---|
| 0140463 | 5/1985 | European Pat. Off. . |
| 2742869 | 1/1987 | Germany . |
| 4041123 | 1/1992 | Germany . |
| 4218381 | 5/1993 | Germany . |
| 2233813 | 7/1989 | United Kingdom . |

*Primary Examiner*—John S. Maples
*Attorney, Agent, or Firm*—Evenson, McKeown Edwards & Lenahan

[57] ABSTRACT

A storage battery cell based on the principle of the oxygen cycle, having a block-shaped, gastightly sealed cell housing in which the rectangular electrode plates of different polarity are stacked. The electrode plates are electrically connected via current collector lugs to positive and negative terminal pillars of corresponding polarity passed through the wall of the same housing side. In order to achieve a longer service life of the cell, the electrode plates are arranged in parallel with the housing wall of the terminal pillars and are enclosed in an equidistant manner on all four peripheral sides of the electrode plates by the walls of the cell housing. All the electrode plates have in each case a central hole on whose inner edge the current collector lugs are mounted, the current collector lugs being routed elastically in the duct formed by the central holes to the terminal pillars of the corresponding polarity. A uniform pressure can be exerted on the electrode stack by means of an area covering arrangement of spring elements. The separators project at least at the outer edge, the edges all being bent axially in the same direction and overlapping in a scale-like manner.

29 Claims, 3 Drawing Sheets

U.S. Patent    Nov. 15, 1994    Sheet 1 of 3    5,364,713
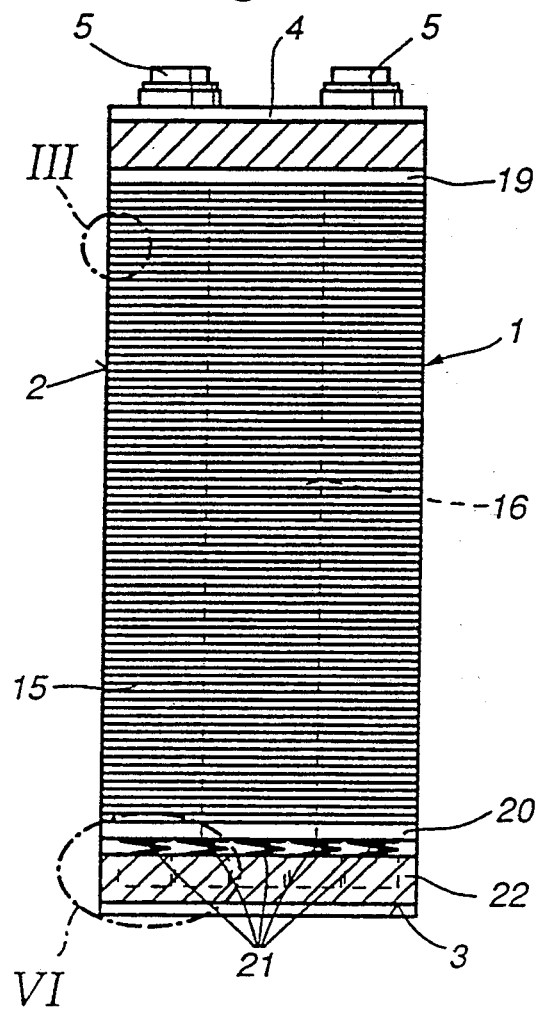
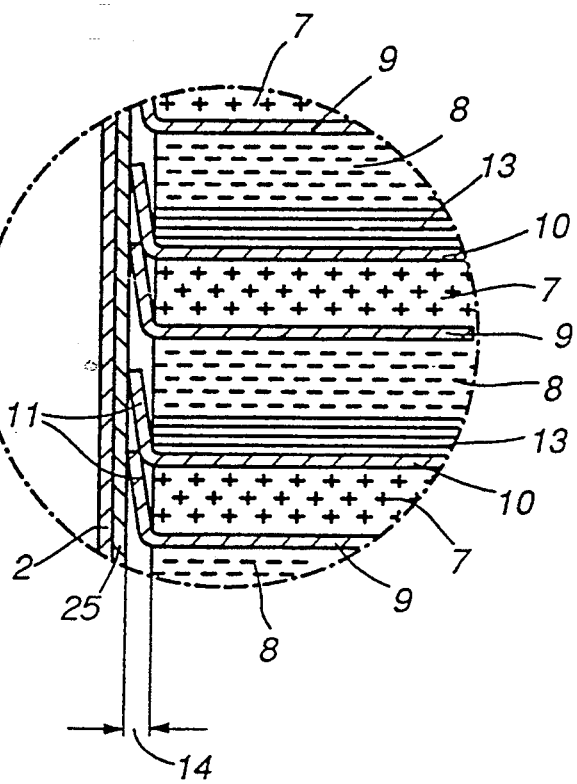
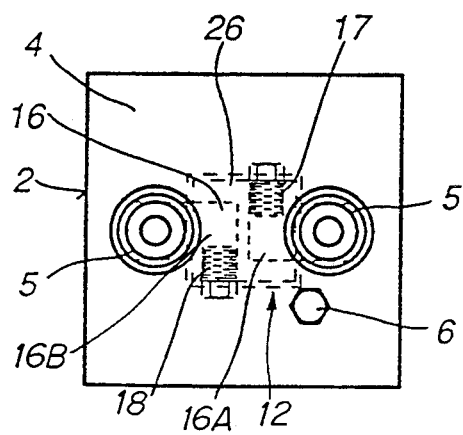
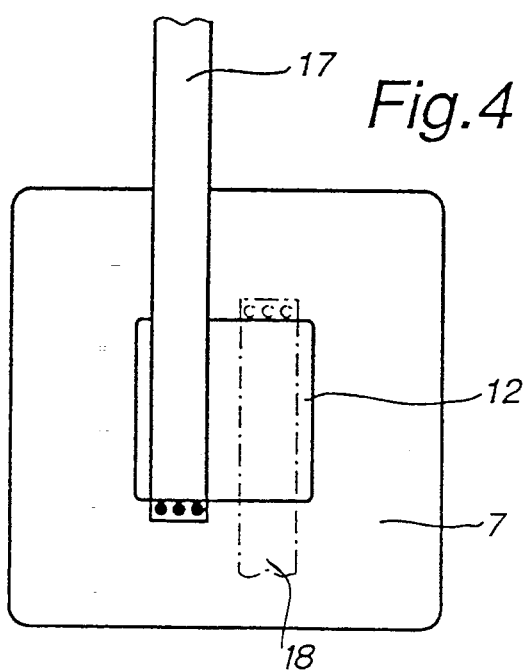

STORAGE BATTERY CELL BASED ON THE PRINCIPLE OF THE OXYGEN CYCLE

BACKGROUND AND SUMMARY OF THE INVENTION

The present invention relates to a storage battery cell based on the principle of the oxygen cycle.

German Patent Specification 27 42 869 discloses a square nickel/cadmium cell in button form, having a block-shaped, sealed gastight polymeric cell housing;

having a few essentially rectangular electrode plates lined up to form an electrode stack and having different polarity, with separators inserted in between in each case;

furthermore having positive and negative terminal leadthroughs which are passed through the wall of the same side of the housing and formed as contact discs integrated in the wall and which are in each case connected in an electrically conducting manner to current collector lugs of appropriate polarity;

the electrode plates being arranged parallel to the largest housing wall of the terminal leadthroughs and all the electrode plates having in each case a central hole, formed and arranged coincidentally, for the passage of a stud which joins the two oppositely situated, largest housing walls together in a tension-proof manner;

the positive electrode plates furthermore being provided in each case with a current collector lug mounted at the edge and the negative electrode plates being provided in each case with a current collector lug which is likewise mounted at the edge, but is arranged in an offset manner with respect to the positive current collector lugs and electrically insulated from them.

Apart from its low storage capacity due to the specific button design cited here, a further disadvantage (even in the case of larger, higher-capacity designs for this type storage battery) of the conventional nickel/cadmium cell design (which can be recognized, for example, in German Patent Specification 40 41 123), is that the service life of the cells is not optimum. The cause of the less than adequate service life is the sensitive electrolyte balance of the low-electrolyte system: in order to be able to exhaust the capacity of the electrodes, on the one hand more than 90% of the pore volume of the electrodes must be filled with electrolyte, and on the other hand, for good charge ability, sufficiently large, electrolyte-wetted, accessible recombination areas must be available for oxygen reduction. The electrolyte can therefore only partly fill the free pore volume of the electrode stack components. The amount of electrolyte in the cell must be determined precisely and maintained, even taking into account changes in the porosity of the electrodes during the service life of the cell. Unavoidable thickness tolerances in the electrode stack components result in differing degrees of compression during their installation in the housing (which of course has predetermined dimensions), and consequently also in different electrolyte absorption in the electrode stack. There is thus a danger that the separators, as the most pliable component in the stack, become compressed and lose electrolyte, so that the resistance increases. A loose packing of the electrode stack, on the other hand, results in an imperfect contact between separator and electrodes, and a high resistance and unequal charge distribution in the electrodes, even in the case of microporous capillary-active separators. Finally, a desired homogeneous electrolyte distribution in large-area separators which are made of polymeric nonwoven fabric and whose capillary activity is usually achieved by wetting agents which are not completely resistant to aging, cannot be reliably achieved in cells of conventional construction. Pressure differences between the internal cell pressure and atmospheric pressure during cycling are transmitted via the cell housing walls to the electrode stack and also result in an undesirable alteration in the stack compression pressure.

Further disadvantages of conventionally constructed nickel/cadmium cells reside in the poorly defined compression state of the electrode stack components, in particular of the separators, which can be most easily compressed, and consequently in their degree of electrolyte filling, and, particularly in the case of large cells, in the imperfect electrolyte distribution in the electrode stack components, specifically, again, in the separators. Although gas diffusion structures offer spare volume for the electrolyte, the rate of oxygen reduction is strongly dependent on their degree of electrolyte filling; the electrolyte absorption capacity of the diffusion structures can therefore only be utilized to a limited extent. Pressure differences between the internal cell pressure and atmospheric-pressure during cycling are transmitted via the cell housing wall to the electrode stack and result in undesirable alterations in the stack compression pressure. In cells of conventional construction, it is precisely the largest face of the housing which presses perpendicularly on the electrode assembly. The bowing of this face of the housing is therefore also the greatest and, consequently, an equal distribution of the compression pressure is most difficult to achieve. The reproducibility of the cells suffers due to the unavoidable thickness tolerances of the stack components, which, as a stack assembly, are pushed into a housing with substantially identical dimensions. The resulting different compression of the stack components, in particular of the separators, requires either an individual adjustment of the quantity of electrolyte (which is in any case difficult to determine), or an acceptance of greater tolerances in the permissible charging current.

Finally, thickness and pore volume of the components alter with service life; in particular, the positive electrodes tend to swell. The separators may therefore be considerably crushed, at least in the vicinity of the housings, which are rigid at the corners, as a result of which electrolyte is pressed out and, in extreme cases, short circuits are produced.

The object of the present invention therefore is to improve the storage battery cells of this basic type so as to provide a longer service life and a better electrolyte distribution.

Proceeding from the acknowledged prior art, this object is achieved by the novel cell structure according to the invention. This structure avoids all the disadvantages of the prior art by utilizing square electrode stack elements having a central hole, which are stacked along an imaginary axis through the central hole, to form a prismatic stack which is higher than the side length of the components. A spring element (for example a slotted spring leaf, an elastomeric cushion or a helical spring assembly), arranged between the cell housing base and the stack essentially fills the cell cross section, and exerts a defined force on the electrode stack. The change in stack height is thus limited to not more than 5% of the stack height. The positive and negative current collector lugs are insulated from one another in the central hole by a separating element, and are routed parallel to the terminals in the housing lid. Overlapping separator edges between stack and housing act as a wall wick and support the housing walls against the atmospheric pressure.

Due to defined axial compression of the electrode stack by means of a face-covering arrangement of the spring elements (which have a moderate pressure that changes only relatively little within the utilizable spring travel), the sensitive electrolyte balance of the cell is affected to no more than a readily tolerable extent, even after a prolonged period of use with gradually swelling electrode plates or during charging and discharging of the cell. A supply of electrolyte which is approximately equal at all the required points can be ensured at all times due to an exchange of electrolyte which is accelerated at all four outer peripheral sides and in the vicinity of the central duct formed by the central holes.

Other objects, advantages and novel features of the present invention will become apparent from the following detailed description of the invention when considered in conjunction with the accompanying drawings.

BRIEF DESCRIPTION OF THE DRAWINGS

FIG. 1 shows a vertical section through a nickel/cadmium cell according to the invention, having electrode plates arranged parallel to the top, and spring elements for axially compressing the electrode stack;

FIG. 2 is a plan view of the cell shown in FIG. 1;

FIG. 3 is an enlarged representation of the detail III, indicated by a circular line in FIG. 1, which detail shows the layer sequence in the electrode stack and the scale-like arrangement of the separator edges;

FIG. 4 is a representation of an individual electrode plate with current collector lug attached thereto;

DETAILED DESCRIPTION OF THE DRAWINGS

Figure 5A:
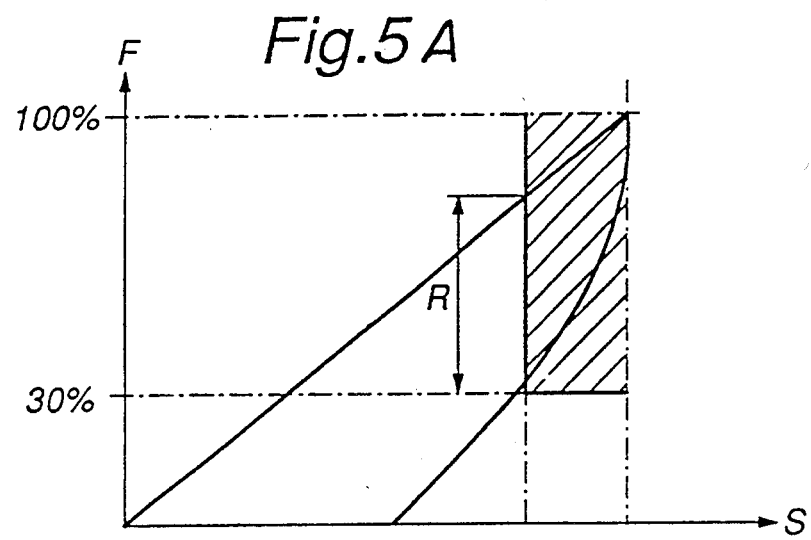
FIG. 5 shows the spring characteristic of the spring elements and its utilizable range, including the effect of a frictional hysteresis.

The storage battery shown in the Figures is based on the principle of the oxygen cycle, with the negative electrode containing cadmium, and the positive electrode plates, on the other hand, containing nickel oxide or silver oxide as the active mass. Moreover, the storage battery contains an alkali electrolyte. By over dimensioning the capacity of the negative electrode, it is assured that the positive electrode is always fully charged first during charging, so that oxygen evolution sets in at the latter on over charging, whereas the hydrogen evolution at the cadmium electrode is suppressed.

The storage battery has a block-shaped, gastight sealed cell housing 1 having housing walls 2, a base wall 3 and a terminal leadthrough wall 4, with both the positive and the negative terminal pillars 5 passing through the terminal leadthrough wall 4. To evacuate the cell housing and inject the electrolyte, an opening which can be gastightly sealed by a closure 6 is provided in the terminal leadthrough wall.

Figure 7:
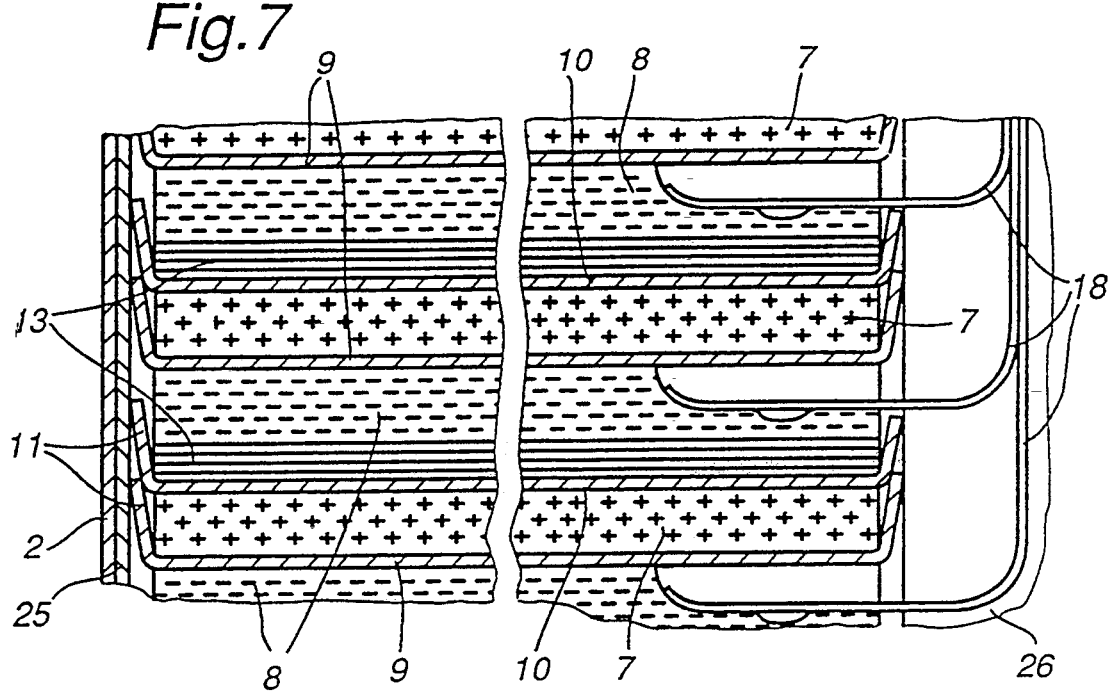
FIG. 7 is an extension of the detail representation compared with FIG. 3 in the direction of the duct formed by the central holes, with the connection of the negative current collector lugs.

Stacked inside the cell housing 1 are a plurality of essentially rectangular (in the exemplary embodiment shown, square) electrode plates 7 and 8 of different polarity forming an electrode stack 15, with separators 9 and 10 inserted in between in each pair of oppositely poled electrode plates, and a diffusion structure 13 between each such pair as shown in FIG. 3. Each of the electrode plates 7 and 8 has a central hole 12, which holes are mutually aligned in registration within the stack. In the exemplary embodiment shown, the holes are square, with their sides being aligned parallel to the sides of the electrode plates. Provided on the central holes are current collector lugs, which are discussed in greater detail below. The central holes of the electrode plates 7 and 8 stacked one upon the other form, inside the electrode stack 15, a duct 16 (FIGS. 1 and 2) through which the positive and negative current collector lugs 17 and 18 respectively (FIGS. 2, 7 and 8), are routed to the terminal pillars 5 of corresponding polarity, and are electrically connected to the latter. (As can be seen in FIG. 4, the current collector lugs 17, 18 are sufficiently long so that they can be bent upward and routed through the central hole 12, when the electrode stack is assembled, as best seen in FIG. 7.)

Figure 8:
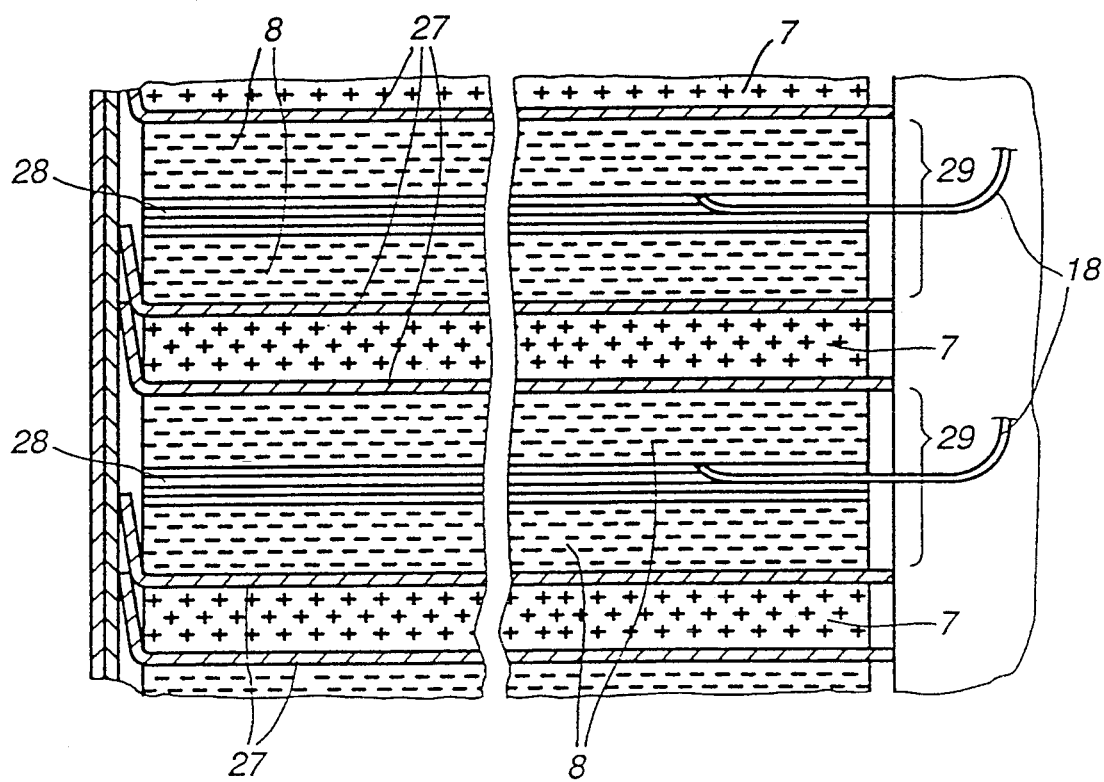
FIG. 8 shows a modification of the layer sequence with current collection from the negative electrode plates, arranged in twos in each case, by a metallized diffusion structure which is inserted in between in each case.

The electrode stack 15, which is oriented perpendicularly to the plane of the individual electrode plates, is aligned in parallel with the housing side face 2 of the cell housing 1, the stack height of the electrode stack being greater than the side length of the electrode plates 7 and 8. The housing side faces 2 are accordingly larger than the terminal lead-through wall 4 and the base wall 3. Due to the current collection from the individual electrode plates in the vicinity of the central hole 12, the cell housing 1 is able to enclose the electrode stack in an equidistant manner on all four peripheral sides. And, specifically, a fixed clearance 14 is provided between the outside edges of the electrode plates 7 and 8, on the one hand, and the inside face of the housing side wall 2. The separators 9 and 10 laid between the electrode plates 7 and 8 are in each case formed as individual, contour-matching sheets which project by means of one outside edge 11 beyond the electrode plates. The projecting edges 11 of the separator sheets are all bent axially in the same direction and overlap in scale-like manner inside the cell housing as shown in FIG. 3, 7 and 8.

Since the internal pressures arising during the operation of the storage battery are low only if the oxygen reduction rate is adequate, and tend to be below the atmospheric pressure, the cell housing may be made of a polymer. To reduce its overall volume and to achieve superior impermeability to gases, however, the cell housing in the exemplary embodiment as shown is made of a thin sheet of stainless steel, an electrical insulation 25 being provided on its interior surface.

Each of the positive electrode plates 7 is provided with a current collector lug 17 mounted on the inside edge of the central hole 12, all the positive current collector lugs 17 being arranged off-center and in line with one another. In the same way, each of the negative electrode plates 8 is also provided with a current collector lug 18 mounted off-center and aligned at the same peripheral point on the central hole. The negative current collector lugs 18 are mounted, however, in an offset position with respect to the positive current collector lugs 17. In FIG. 4, the negative current collector lug 18 is indicated by a chain dot line and is arranged in mirror-image fashion with respect to the positive current collector lug shown in continuous lines. As noted previously, in the assembly of the electrode stack 15, the elongated lugs 17 and 18 are bent upwardly perpendicular to the plane of the electrodes 7, 8 and are routed through the central duct formed by the holes 12. The current collector lugs 17 and 18 and their connection to the terminal pillars 5 are in each case elastically formed, so that the electrode plates 7 and 8 are able to perform small relative movements in the vertical direction inside the cell housing without hindrance by the current collector lugs.

Figure 6:
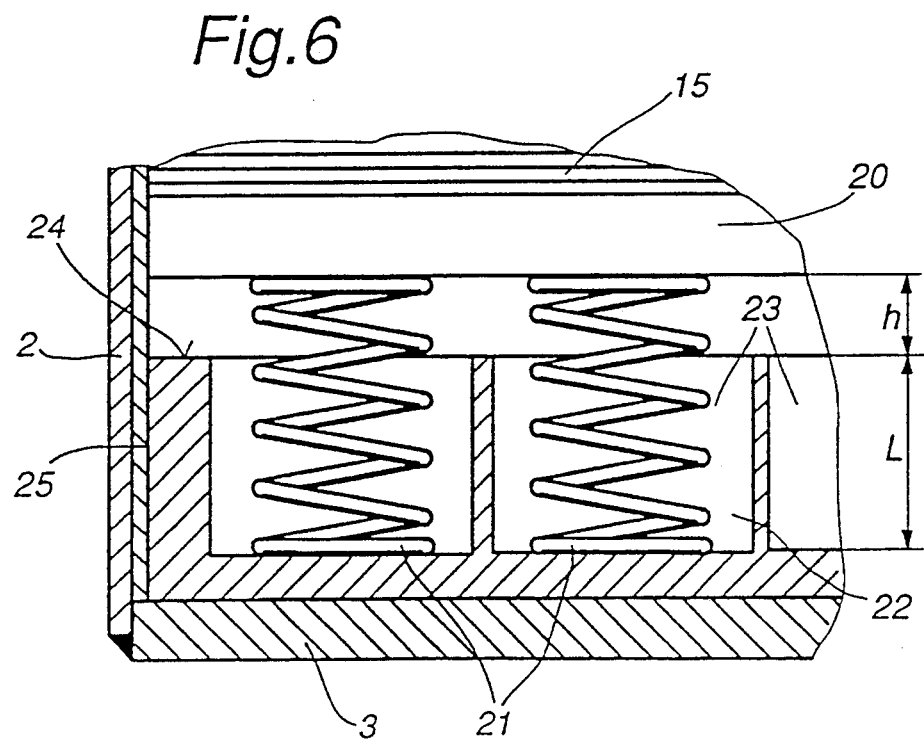
FIG. 6 is an enlarged representation of the detail IV, indicated by a circular line in FIG. 1, which detail shows the mounting of the spring elements, which are formed as helical springs.

Arranged at either end of the electrode stack 15 inside the cell housing 1 are pressure plates 19 and 20, of which one pressure plate (in the exemplary embodiment shown, the upper pressure plate 19) is supported on the housing, and has recesses for receiving the terminal pillars and clamping the current collector lugs to the terminal pillars. The other pressure plate (in the exemplary embodiment shown, the lower pressure plate 20) is supported only indirectly on the corresponding housing wall (in this case, on the base wall 3), and must have a pressure which can be applied thereto which is approximately uniform over its entire extent. For the latter purpose, a face-covering arrangement of spring elements 21 is provided, the spring elements 21 being supported on the inside of the appropriate housing wall (that is, in this case the base wall 3), as best shown in FIG. 6. In the exemplary embodiment shown, the spring elements 21 are formed by a multiplicity of helical compression springs incorporated locally, and functionally parallel to one another in a perforated plate 22. In this arrangement, one helical compression spring is held and guided by a hole 23 in the perforated plate. Instead of a multiplicity of helical compression springs, the spring elements may also be formed by a permanently elastic, perforated rubber layer or by a multiplicity of rubber cylinders, in which case, however, there is the danger of creep or of slow alteration of the spring characteristic.

The spring elements 21 are formed and/or arranged in such a way that they provide an effective spring travel h of about 1% to 5% of the stack height of the electrode stack 15, with the relatively larger spring travel being chosen in the case of smaller stacks. Limitation of the spring travel h is effected by a suitably large dimensioning of the height of the perforated plate 22; with full utilization of the spring travel due to an increase in the stack height, the lower pressure plate 20 makes contact with the top 24 of the perforated plate. (See FIG. 6.)

Moreover, the spring elements should be dimensioned in such a way that a pressure of 5 to 25 N/cm2 can be exerted by them on the electrode stack. In proportion to the elasticity of the separators 9 and 10, the spring elements should be dimensioned in such a way that, because of the pressure exerted on the electrode stack on the part of the spring elements the elastic separators are compressed only to about 55% to 80%, (preferably to 60% to 70%) of their unloaded initial thickness. Excessive compression of the elastic separators by the spring elements should be avoided. Although the pressure exerted by the spring elements increases as they are compressed, suitable choice of the spring characteristic should achieve the result that the pressures exertable on the electrode stack do not diverge too far even for the strongest compression of the springs, on the one hand, or for their greatest extension on the other, as shown in FIG. 5.

Figure 5B:
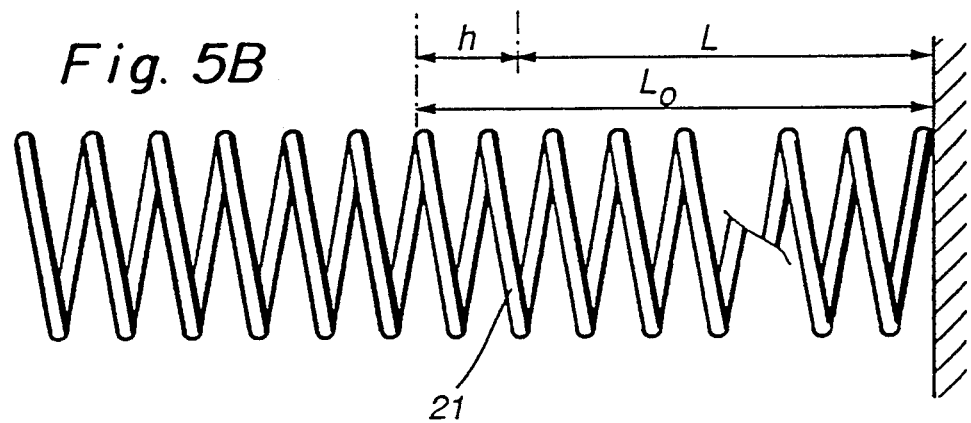

At the bottom of FIG. 5, a helical compression spring 21 is shown in stylized form, and at the top thereof, is a force/travel diagram, in which two different spring characteristics are plotted. The straight-line spring characteristic is valid for a resistance-free compression of, or load removal from, the spring element; the force increases linearly from zero with increasing compression. Once the spring has reached its working length L at its largest compression, the spring force has reached the value 100%. The working range in terms of travel is characterized by the utilizable spring travel h; the greatest possible length $L_o$ which can be utilized within this spring travel is also plotted in FIG. 5. Resistances to the movement of the electrode plates and, in particular, of the separator plates inside the cell housing results in a hysteresis like displacement of the spring characteristic downwards, as has also been plotted in FIG. 5. In the example shown in FIG. 5, the resistance force R is more than length $L_o$. The spring forces actually still left over for half the resistance-free spring force for the spring the spring length $L_o$ are, in the case of the numerical example chosen, only 30% of the theoretically highest possible spring force for the maximum compression of the spring to the length L. The objective is that this lower value is at least about 25%, and preferably more than 35%

Because of the compression of the electrode stack with a defined force, constructional tolerances in the individual components of the electrode stack can be compensated for and the relatively soft separators can be kept at constant thickness as a result of a compressive pressure of defined level, even if the electrodes should swell in the course of the use of the storage battery. For conventional nonwoven polyamide separators, a working pressure at which the separators are compressed to about 60% of their unloaded thickness has proved expedient. This requires a "soft" spring characteristic, with low force changes over a long spring travel. Nevertheless, the arrangement also has to be vibration-resistant, for example for space travel purposes, which normally requires high, progressive spring forces. In an example of a storage battery which has been constructed, the electrode-stack comprised a total of 176 individual components having a nominal height of 161 mm; the electrode plates have a side length of 61 mm, diffusion structures, separators and recombination structures being provided. To overcome the friction of the stack un the housing wall, a force of 130 to 140 N was necessary. For this stack, a spring assembly having a spring constant of 90 N/mm was selected. The utilizable spring travel h was limited to 6 mm; the springs projected to this extent out of their holes 23 in the perforated plate 22 in the unloaded state. (See FIG. 6.) Consequently, a maximum spring force of 540 N was available. In the ready-to-use cell, the springs projected 3 mm out of the spring plate; this corresponded to a force on the electrode stack of 270 N. For a stack "breathing path" of ± 1 mm, corresponding to about 1.2% of the stack height, due to the change in density of the masses during charging and discharging, the force which could be exerted by the springs was 180 to 360 N. The travel limitation is necessary to be able to define a maximum stack height for the purpose of dimensioning the lug lengths from the electrode plate nearest the base of the terminal pillar. In the event of shrinkage of the stack height, the longest lug can bend in an arc shape in the duct 16, as can, to a lesser extent, the current collector lugs of the electrode plates situated nearest the terminal leadthrough wall 4. Stretching beyond the length of the current collector lugs would load the joint between the current collector lugs and the electrode plates, and could result in the current collector lugs being torn out.

Giving the electrode stack a square cross section as described above keeps the weight of the passive components necessary for the operation of the storage battery (pressure plates and spring elements, which are additionally necessary compared with conventional storage batteries) relatively low.

The electrode stack components arranged perpendicular to the large-area housing side walls 2 are able to absorb substantially higher forces than if they are arranged parallel to the large-area housing walls. Since the internal pressures occurring during the operation of the storage battery are low only if the oxygen reduction rate is adequate, and tend to be below the atmospheric pressure, the electrode stack supports the large-area housing sidewalls against the outside atmospheric pressure on all four sides. On the other hand, the electrode stack, in particular its separators, is relieved of forces which act on the cell housing because of exterior pressure.

Compared with conventional designs of comparable storage batteries, the central hole or the shaft 16 formed by the central holes 12 facilitates the removal of heat from the electrode stack by a fairly short heat conduction path. Compared with cylindrical cells, the square housing cross section makes possible, moreover, a substantially better packing density in assembling batteries from the individual cells. A possible disadvantage of a temperature distribution which is not quite as uniform in the square elements as in circular elements appears, in contrast with this, relatively minor.

Allowing for the volume taken up by the current collector lugs and an insulating body 26 inserted in the duct (FIGS. 2 and 7), the volume of the duct formed by the central holes may, for example, be dimensioned so that it is able to accept the entire volume of the electrolyte necessary. When put into operation, the evacuated, dry cell can be quickly filled with the total quantity of electrolyte, which is able to distribute itself uniformly over all the components of the electrode stack if the storage battery is positioned horizontally after the closure provided in the terminal leadthrough wall 4 has been sealed.

The arrangement of the current collectors lugs inside the duct formed by the central holes 12 avoids the induction of interference voltages in adjacent components in the event of load current changes at fairly high frequency. Furthermore, during charging and discharging, this arrangement gives the current collector lugs sufficient space to move when the electrode stack "breathes", and at the same time to be able to adopt a changed bending pattern without hindrance. In addition, the arrangement of the contact of the current collector lugs near the plate center achieves a uniform current density distribution in the individual electrode plates.

The arrangement of the individual electrode plates parallel to the smaller housing wall, namely parallel to the smaller base wall 3 and terminal leadthrough wall 4, does indeed increase the number of electrode plates for a given storage battery capacity compared with the number of electrode plates for a conventional design, as a result of which the expenditure on construction increases. Such design of the electrode plates, however, also makes it possible to use time-saving, automated manufacturing techniques. The assembly of the individual elements of the electrode stack can take place from one direction. The alignment of the individual components is relatively simple and can therefore readily be automated, with the result that the increase in the number of components is not a substantial disadvantage. Finally, this design also makes possible a simple, finely gradable adjustment of the capacity as a result of a suitable choice of stack height and housing case height.

The spring elements provided at one end face of the electrode stack ensure a defined compression state of the electrode stack (in particular of the relatively easily compressible separators) which in turn ensures that the electrodes have a certain minimum pore volume for absorbing electrolyte at every point and hence an ordered cycle of the chemical processes proceeding during charging and discharging of the storage battery. This operational reliability is also provided over a long service life with many charge and discharge cycles and electrode plates altering in size. The separator edges 11 arranged so as to lap one on top of the other in a scale-like manner between housing sidewall 2 and electrode stack 15 (FIGS. 3, 7 and 8) are, on the one hand, of manufacturing significance because they avoid the laborious pocketing, in the case of conventional cells, of individual electrode plates in prefabricated separator pockets or the folding of long separator strips around the electrode plates. At the outside edge, the electrode plates are enclosed by the overlapping edges 11 of the separators. In this connection, in the event of a very tight fit of the electrode stack in the case of the cell housing and, correspondingly, of strong radial compression of the separator edges, these overlapping edges act as a hydraulic seal, which produces a separator pocket that is open towards the central hole 12 of the respective electrode plate. The edges of at least two adjacent separators should overlap to such an extent that the electrode plates having a particular polarity are completely enclosed at their outside edge. Alternatively, separator edges which have a longer projection may (for example, if the electrode stack fits more loosely into the case of the cell housing) form a continuous wall wick which ensures an effective equalization of concentration and a good, uniform distribution of the electrolyte inside the electrode stack.

Arranged in the duct 16 formed by the central holes 12 in the electrode stack 15 is an insulating body 26 which can be introduced axially into the duct, as shown in FIGS. 2 and 7. The outer envelope surface of this insulating body matches the cross-sectional shape of the shaft, a clearance of at least 1 mm being left all round, however, with respect to the inside contour of the duct. As shown by the dashed line in FIG. 2, the cross section of the insulating body 26 is formed roughly in an S-shape, axially extending recesses 16A, 16B being formed which receive the current collector lugs 17 and 18 and which electrically insulate the current collector lugs of different polarity from one another. Towards the central hole, the separator sheets may project linearly inwards by about 1 to 2 mm as is illustrated in FIG. 8. Surprisingly, it was found that separator edges projecting freely into the inner hole or into the inner duct with only such a small overhang beyond the electrodes ensure a completely adequate separation of the electrode plates with respect to dendrite growth. Instead of a linear overhang of the separator edges in the vicinity of the central hole, however, they may also overlap, as illustrated in FIG. 7, in a scale-like fashion with a greater overhang and be compressed by the inner insulating body 26, as a result of which a hydraulic gas barrier can be produced.

The advantages of the design according to the invention also apply to the variants described below which, depending on the application, serve to develop the pore distribution or the recombination control effected thereby:

The detailed representation shown in FIG. 3 shows a cross section through the electrode stack 15, including the housing side wall 2 with inside insulation 25. In the exemplary embodiment shown therein a coarse-pored separator 10 then a diffusion structure 13, a negative electrode plate 8 thereon and a fine-pored separator 9 laid thereon are provided on a positive electrode plate 7. This group of five elements in total repeats itself in the same sequence inside the electrode stack. The fine-pored separators 9 are therefore arranged directly between a positive electrode plate 7, on the one hand, and a negative electrode plate 8, on the other. The fine-pored separators 9 are particularly capillary active and accordingly bind the electrolyte well, but offer a relatively high resistance to gas breakthroughs. The coarse-pored separators 10 are arranged between, on the one hand, the positive electrode plate 7 and, on the other hand, the diffusion structure 13 which makes electrical pressure contact with the negative electrode 8 and is at negative potential because of the metallization. The coarse-pored separators 10 have particularly low capillary activity and accordingly bind only relatively little electrolyte and, on the other hand, are correspondingly relatively readily permeable to gas.

This achieves the result that, during overcharging, the oxygen produced at the positive electrodes is able to get into the diffusion structure over the entire area and by the shortest path through the coarse-pored separator. Surprisingly, it was found that a high electrolyte binding in the case of the separator 9 provided between the positive and the negative electrode plate, on the one hand, and a low binding of electrolyte in the case of the separator provided between the positive electrode plate and the diffusion structure 13 on the other hand, is also established if both separators are made of the same material, for example of a nonwoven polyamide having a porosity of about 70%.

The hydraulic contact is good as a result of the separators 9, which are almost completely filled with electrolyte, between the fine-pored capillary-active positive and negative electrodes and results in a low electrical resistance. The hydraulic contact via the low-electrolyte separators 10 between the diffusion structure 13 with low capillary activity and the positive electrodes is at least sufficient to make possible an equalization of the concentration of the electrolyte in the electrode stack. The chargeability of such a cell with a current which charges the storage battery completely in one hour was demonstrated over more than a thousand cycles without symptoms of a capacity loss being exhibited.

Obviously, the above mentioned effect of a preferred oxygen passage through the separators 10 from the positive electrode plate 7 into the diffusion structure 13 is more effective if, as stated, the separators 10 are coarse-pored, or are at least formed with coarser pores than the separators 9. In this connection, the separators are expediently selected for their gas breakthrough pressure in the liquid-impregnated state. And, specifically, the fine-pored separator 9 should have a gas breakthrough pressure of at least 0.5 bar in the state in which it is impregnated with liquid but removed from the electrode stack, and the coarse-pored separator 10 should have a gas breakthrough pressure of not more 0.1 bar. Moreover, the gradation of the gas breakthrough pressures between fine-pored separator 9 and coarse-pored separator 10 is chosen in such a way that the ratio of the gas breakthrough pressure values of the fine-pored and coarse-pored separators built into a cell is greater than 10.

In the prior art, a so-called "split-negative" arrangement of the components in the electrode stack was provided, in which the negative electrode plates are divided and a diffusion structure 13 or, as shown in FIG. 8, a recombination body 28 is provided between them in each case. This design normally requires, however, twice as many negative current collector lugs as positive ones, which is costly not only in terms of production but also in space requirements. Surprisingly, it has now been found that the current collection from the two associated negative electrode plates can be achieved via the diffusion structure or the recombination body 28 arranged centrally between them if it is made from a material of suitable structure, for example a fibre composite structure in the form of a nickel-plated polypropylene needle punched felt. The contact between the diffusion structure or recombination body and the two adjacent negative electrodes is a planar pressure contact. The contact resistance of this contact proved to be sufficiently low, even with the relatively low compression pressure which results from the force exerted by the spring elements 21 on the electrode stack. The vibration resistance was also equally surprising: when loaded with 40 times the acceleration due to gravity, the electrode stack suffered neither mechanical nor electrical damage. The number of the negative current collector lugs 18 becomes virtually equal to the number of the positive current electrode lugs 17 as a result of the current collection in FIG. 8 or of the provision of the negative current collector lugs on the recombination bodies 28 inserted in between. Depending on the choice of polarity for the end electrode plates, the number of the positive collector lugs is one lug greater or less than the number of negative current collector lugs.

When supplemented by a scale-like overlapping of the separator edges in the vicinity of the central hole 12 as well, the embodiment, shown in FIG. 3, of the electrode stack having separators 9 and 10 with different capillary activity is distinguished by the following advantages: an oxygen diffusion over the entire surface is enforced from the back of the positive electrode, preferably formed as a nickel oxide electrode, through the macroporous separator 10 to the diffusion structure 13 in contact with the adjacent negative electrode 7, which is preferably formed as a cadmium electrode. The resulting electrolyte displacements are quickly equalized by the wick action of the separator edges which overlap at the outside and inside of the stack. This construction is recommended, in particular, for operation with high charging and overcharging rates and high requirements imposed on the cyclic service life because the entire area of the diffusion structure is utilized. The temperature distribution and the distribution of the electrolyte concentration over the electrode area are equalized and contribute to a long service life of the electrode plates.

In an embodiment of the electrode stack comprising microporous separators, with separator edges overlapping at the outside and projecting linearly on the inside but only by about 1 to 2 mm, the oxygen is forced to leave the positive electrode via the periphery of the central hole. In the duct formed by the central holes inside the electrode stack, the oxygen is able to distribute itself uniformly over the electrode stack and penetrate the diffusion structure 13 from the duct. Owing to the uniform charge distribution over all the electrodes regardless of their point of incorporation in the stack, this results in a high service life of the cell.

A plurality of storage batteries were built and tested having the features described above. For example, a cell was built which had a capacity of 40 Ah with an electrode plate arrangement in the stack as shown 5 in FIG. 8, but in which diffusion structures were provided between the pairs of negative electrode plates. The electrode stack comprised thirty-four nickel electrodes, thirty-five diffusion structures, sixty-eight cadmium electrodes and sixty-nine nonwoven polyamide separators of the same quality. The side length of the electrodes and diffusion structures was 61 mm, and that of the square central hole 25 mm. For the separators, the corresponding dimensions were 65 mm and 23 mm. The positive electrode plates and the diffusion structures were provided with nickel-sheet current collector lugs 8 mm wide and 0.2 mm thick. Arranged between the electrode stack and the upper pressure plate 19 was a recombination body having the same dimensions as the electrode plates. The recombination body provided at the end of the electrode stack comprised a diffusion structure on whose nickel-plated surface platinum and palladium had been deposited in order to accelerate catalytically the oxidation of small quantities of hydrogen in the cell. The recombination body adjacent to the upper pressure plate 19 was separated from the last electrode plate by one of the separators. However, a different arrangement and number of recombination bodies may be chosen.

The total height of the electrode stack was 135 mm, with a spring force of about 300 N acting on the stack. The separators were compressed in the stack to 63% of their nominal thickness. Sixteen helical compression springs having a maximum spring travel of 6 mm were provided as spring elements. The cell contained 170 cm of potassium hydroxide solution electrolyte with a density of 1.31 g/cm$^3$. The housing side wall 2 was made of 0.3 mm thick stainless steel, whereas the terminal leadthrough wall 4 and the base wall 3 were made of 0.6 mm thick metal sheet of the same quality. Pressure tests on the cell housings yielded bursting pressures of over 40 bar. The dimensions of the cells were 63mm×63 mm ×160 mm, not allowing for the terminal pillars; including the terminal pillars, the cell was 167 mm high. The weight was 1430 g. For discharge with a current of 20 amperes, a capacity of 42 Ah was measured at mean discharge voltage of 1.2 volts. This yields an energy content of 78.8 Wh/l or of 35.2 Wh/kg.

The reinforcement of the cell housings by the upper and the lower pressure plates 19 and 20 proved to be advantageous for the assembly of individual cells to form a battery. In order to avoid a deformation of the thin metal-sheet housings, it is expedient to introduced forces exerted by linking elements, for example tie rods, into the reinforced sections of the housings. The elastic support of the housing walls by the separator edges results in a good thermal area contact of the unreinforced wall sections with one another or with aluminum plates often used for heat removal.

The improvements achieved in this way can, of course, be extended to electrochemically related cell types or battery systems of gastight construction involving oxygen recombination, such as cadmium/silver oxide, zinc/nickel oxide, or zinc/silver oxide.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. Storage battery arrangement based on an oxygen cycle, having a cadmium electrode as negative electrode and containing an alkaline electrolyte, comprising:

a rectangular-shaped gastightly sealed housing;

positive and negative terminal pillars which pass through a terminal leadthrough wall of said housing, and which are electrically connected to respective positive and negative current collector lugs;

a plurality of substantially rectangular positive and negative electrode plates which are stacked in parallel alignment with the terminal leadthrough wall, and with alternating positive and negative polarities, to form an electrode stack;

a plurality of separators, one separator being inserted between each successive pair of said electrode plates;

each of the negative electrode plates having a greater storage capacity than the positive electrode plates;

each of the electrode plates having a mutually coincidentally formed and arranged central hole and being enclosed in an equidistant manner on all four peripheral edges of the electrode plates by a sidewall of said housing situated perpendicular to the terminal leadthrough wall;

each of the positive electrode plates furthermore being provided with a positive current collector lug mounted in a mutually identical location at a periphery of the central hole;

each of the negative electrode plates being provided with a negative current collector lug which is also mounted in a mutually identical location at the periphery of the central hole, but electrically insulated from, and offset with respect to the location of, the positive current collector lugs;

said current collector lugs being routed in a duct formed inside the electrode stack by the central holes, to the terminal pillars of corresponding polarity;

the current collector lugs and their connection to the terminal pillars being elastically formed, whereby the electrode plates are able to perform small relative movements inside the cell housing without hindrance due to the current collector lugs;

at least first and second pressure plates arranged inside the cell housing at either end of the electrode stack, said first pressure plate being supported on the housing, and said second pressure plate situated at an end of said electrode stack opposite said first pressure plate and being supported by a plurality of spring elements which are distributed over a surface of said second pressure plate and are themselves supported at least indirectly on an interior surface of a wall of said housing, whereby said spring elements exert a pressure on said second pressure plate which is substantially uniform over said surface thereof; and said separators each being formed as individual, contour-matching sheets which project outwardly beyond as least an outside edge of said electrode plates, and are also provided with a central hole, and whose projecting edges are all bent axially in a common direction and overlap in a scale-like manner.

2. An arrangement according to claim 1, wherein the electrode stack has a longitudinal axis which is oriented perpendicular to planes of-the individual electrode plates, and is aligned in parallel with a longest surface of the housing.

3. Arrangement according to claim 1, wherein stack height of the electrode stack is greater than a longest dimension of the electrode plates.

4. Arrangement according to claim 1, wherein the electrode plates are substantially square.

5. Arrangement according to claim 1, wherein the central holes of the electrode plates are substantially rectangular.

6. Arrangement according to claim 1, wherein said central holes of said electrode plates are substantially square.

7. Arrangement according to claim 5, wherein the sides of the central holes are arranged in parallel with the sides of the electrode plates.

8. Arrangement according to claim 1, wherein the spring elements provide an effective spring travel equal to 1% to 5% of the stack height of the electrode stack.

9. Arrangement according to claim 1, wherein the spring elements are arranged in the vicinity of a wall of said housing situated opposite the terminal leadthrough wall.

10. Arrangement according to claim 1, wherein the spring elements exert a pressure of 5 to 25 N/Cm$^2$ on the electrode stack.

11. Arrangement according to claim 1, wherein the spring elements cause a compression of the elastic separators in the electrode stack to about 55 to 80 percent of unloaded initial thicknesses thereof.

12. Arrangement according to claim 1, wherein the spring elements cause a compression of the elastic separators in the electrode stack to about 60 to 70 percent of unloaded initial thicknesses thereof.

13. Arrangement according to claim 7, wherein a ratio between:

pressure exerted by said spring elements at a largest spring length inside an effectively usable spring travel, allowing for a slipping resistance of the electrode stack inside the cell housing, and pressure exerted by said spring elements at a strongest spring compression inside the usable spring travel, without the action of a sliding resistance of the electrode stake within the cell housing, is more than approximately 0.35.

14. Arrangement according to claim 7, where a ratio between:

pressure exerted by said spring elements at a largest spring length inside an effectively usable spring travel, allowing for a slipping resistance of the electrode stack inside the cell housing, and pressure exerted by said spring elements at a strongest spring compression inside the usable spring travel, without the action of a sliding resistance of the electrode stack within the cell housing, is approximately 0.25.

15. Arrangement according to claim 1, wherein the spring elements comprise a multiplicity of helical compression springs incorporated locally and functionally in parallel with one another in a perforated plate, one of the helical compression springs being held and guided in each case in a hole in the perforated plate and the surface, facing the electrode stack, of the perforated plate limiting the usable spring travel (h) of the helical compression springs at the greatest spring compression (spring length L).

16. Arrangement according to claim 1, wherein the cell housing is made of metal, and an interior surface thereof is covered with an electrical insulation.

17. Arrangement according to claim 16, wherein the cell housing is made of stainless steel.

18. Arrangement according to claim 7, wherein there is arranged in the duct formed by the central holes in the electrode stack, an insulating body which can be introduced into it axially, whose outer envelope surface matches a shape of said duct, with a clearance of at least 1 mm being left with respect to the inner contour of the duct, and which has an approximately S-shaped cross-section that forms axially extending recesses in said duct which receive the current collector lugs and guide them and electrically insulates the current collector lugs from one another.

19. Arrangement according to claim 1, wherein the separators project linearly radially inwards by about 1 to 2 mm in the vicinity of the central hole.

20. Arrangement according to claim 7, wherein the separators project radially inwards by an amount which is at least equal to thickness of the electrode plates in the vicinity of the central hole, and inwardly projecting edges thereof are permanently bent so that they mutually overlap in a scale-like manner.

21. Arrangement according to claim 7, further comprising, adjacent to each of the negative electrode plates, a gas-permeable, electrically conducting diffusion structure having an outline contour which corresponds to that of the electrode plates, said electrically conducting gas diffusion structure being pressure-contacted electrically only with one of: the associated negative electrode and a corresponding recombination body, the recombination body additionally being provided also with a platinum coating which catalytically promotes a hydrogen oxidation.

22. Arrangement according to claim 21, wherein the separators adjacent to a negative electrode plate are of different construction, with the separator arranged on that side of the negative electrode plate which directly faces a positive electrode plate being of fine-pored and capillary-active construction, and the separator arranged on the opposite side of the negative electrode plate which faces a positive electrode plate being of coarse-pored and gas-permeable construction.

23. Arrangement according to claim 21, wherein there are assigned to each positive electrode plate two negative electrode plates each having arranged between them and electrically pressured-contacted to both of them, one of: a diffusion structure and a recombination body.

24. Arrangement according to claim 23, wherein the current collector lugs of each pair of negative electrode plates are mounted on the diffusion structure or recombination body arranged between them.

25. Arrangement according to claim 21, wherein the diffusion structure has a porosity of 50% to 90%, with pores having a diameter of about 20 to 200 μm.

26. Arrangement according to claim 22, wherein the fine-pored separator in the state in which it is liquid-impregnated but removed from the electrode stack has a gas breakthrough pressure of at least 0.5 bar and the coarse-pored separator has a gas breakthrough pressure of not more than 0.1 bar, and wherein a ratio of the gas breakthrough pressure values of the fine-pored and coarse-pored separators incorporated in a cell is greater than 10.

27. Arrangement according to claim 1, wherein a pore volume of all the diffusion structures present, and a free volume of the duct formed by the central holes and not occupied by the current collector lugs and the insulating body can absorb all of an electrolyte necessary for the cell.

28. Arrangement according to claim 1, wherein the positive electrode plates contain nickel oxide as active mass.

29. Arrangement according to claim 1, wherein the positive electrode plates contain silver oxide as active mass.

* * * * *